United States Patent Office 3,549,249
Patented Dec. 22, 1970

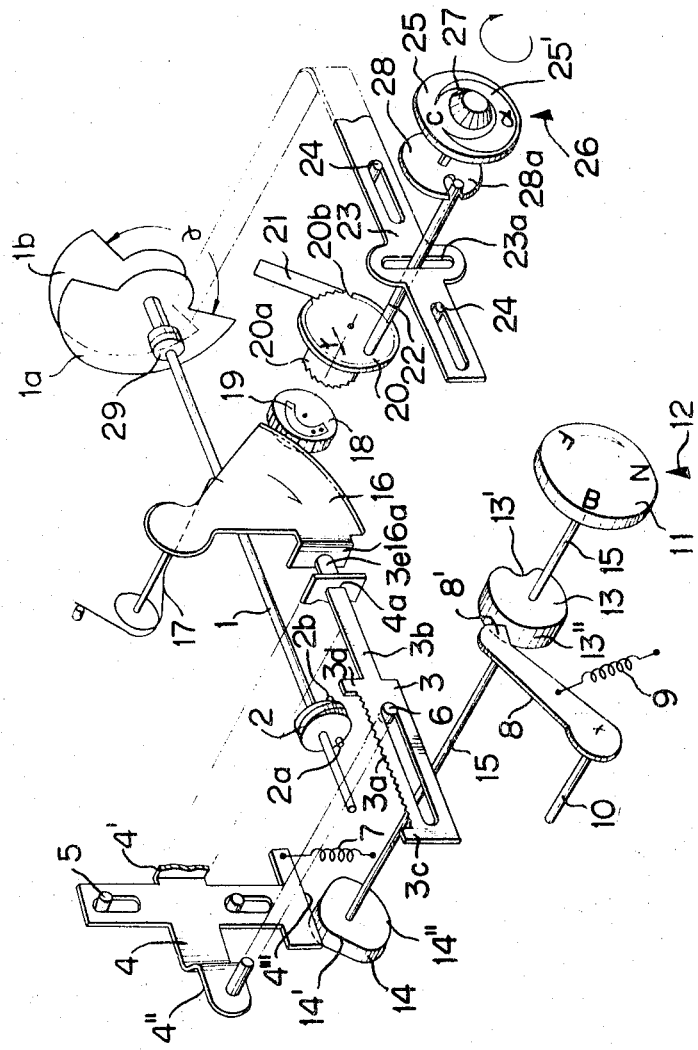

3,549,249
DISSOLVING SHUTTER MECHANISM FOR MOTION PICTURE CAMERAS
Yoshihisa Katsuyama, Yokohama-shi, Japan, assignor to Nippon Kogaku K.K., Tokyo, Japan, a corporation of Japan
Filed Jan. 5, 1968, Ser. No. 696,031
Claims priority, application Japan, Jan. 13, 1967, 42/2,210, 42/2,211
Int. Cl. G03b 21/36
U.S. Cl. 352—217                                7 Claims

ABSTRACT OF THE DISCLOSURE

A dissolving shutter mechanism is provided for a motion picture camera wherein fade-out and fade-in operations are automatically made. A reciprocal member is provided for changing the open angle of the shutter, the reciprocal member being moved a predetermined distance to provide for fade-in operation in one direction and fade-out operation in the opposite direction. A one way interlocking member interlocks the shutter drive mechanism and the reciprocal member so that the change in the angle of opening of the shutter is complete in one direction and in the opposite direction by a half revolution of the interlocking member.

---

This invention relates to a dissolving shutter mechanism for motion picture cameras to provide fade-in and fade-out operations.

According to the prior art, when fade-in or fade-out photography is carried out, a specific switching number is provided between the driving means and fading member which is manually operated. This operation becomes complicated because the switching operation must be carried out at the same time with the shutter releasing operation to be the drawback.

The present invention aims to remove the above drawback and provide an improved device in which when the driving means is operated the fade-in and out operations are always operable and the switching over to either of the two operations provides for the automatic fade-in or fade-out operation upon depression of the shutter release button. Consequently, when fade-in or fade-out operation is carried out, the operation required is only to release the shutter with the result that the operation is remarkably simplified.

The present invention will be described more in detail with respect to an embodiment shown in the drawing.

In the drawing, a shutter shaft 1 is provided for a motion picture camera which is rotatable in a forward or reverse direction by an appropriate power source such as a motor (not shown). Conventional shutter blades 1a and 1b of the variable open angle type are provided on the end of the shaft, the arrangement being such that the blades are stopped at a predetermined position, in the well known manner. With the operation of the shutter shaft in either direction, conventional means (not shown) interlocked with a film feeding claw will move the film past the shutter in the film advancing or film rewinding direction. A worm gear 2 is secured to the shutter shaft 1 and provided with control pins 2a and 2b secured in the opposite faces thereof. A horizontally movable plate 3 is provided formed with a rack gear portion 3a which may be meshed with the worm gear 2 and a tongue portion 3b at the end thereof. Control projections 3c and 3d are formed at both ends of the rack gear portion 3a and as will hereinafter appear, the number of revolutions of the shutter shaft 1, or more practically, the length of the film advanced or rewound is determined by the distance between projections 3c and 3d. It will become apparent that the projections 3c and 3d may be made longitudinally adjustable to provide for film lengths of various predetermined lengths. The control pin 2b is adapted to be engaged by the projection 3d, and as the worm gear 2 is rotated in the film advancing direction the moving plate 3 shifts to the right until the pin 2a engages the projection 3c whereby further rotation of the shaft 1 is prevented. The horizontally movable plate 3 is guided to move parallel with the shutter shaft 1 by a square opening 4a slidably receiving the tongue portion 3b and a pin 6 provided on a vertically movable plate 4. The movable plate 4 is guided perpendicular to the shutter shaft 1 by pins 5.

The opening 4a is formed in one of the supporting arms 4' of plate 4, and the guide pin 6 is provided on another supporting arm 4''. The bottom portion 4''' of the vertically movable plate 4 abuts a cam 14 hereinafter described, due to the bias of a spring 7 thereby determining the vertical position of the plate 4 and thus the arm 4' and pin 6. A reversing lever 8 is provided which is biased by a spring 9 against the periphery of a reversing cam 13 mounted on a shaft 15, the reversing lever being interlocked as by shaft 10 with a switch or other means, not shown, for reversing the rotation of the motor driving the shutter shaft. A switching dial 11 is secured to the end of the shaft 15 to which the reversing cam 13 and a switching cam 14 is secured, the dial 11 being provided with indicia N, F and B which is read against a fixed index 12 to indicate normal forward and backward operation, respectively.

The reversing cam 13 is formed with a low point 13' which is so positioned that only when the indicia B on the switching dial 11 is aligned with the index 12 will the end 8' of the reversing lever 8 fall into the low point 13' to rotate the shaft 10 in a clockwise direction to reverse the direction of rotation of the shutter shaft 1 through the reversing mechanism not illustrated. When the switching dial 11 is positioned to align the indicia F or N with the index, the end of lever 8 rides on the high arcuate section 13'' of the cam to provide for the forward rotation of the shutter shaft.

The switching cam 14 secured on shaft 15 with the switching dial 11 is formed with low portions 14' separated by high portions 14''. With the switch dial 11 in the N position as illustrated, the vertically movable plate 4 is in its lower position so that the movable plate 3 is lowered through the guide pin 6 and supporting arm 4' to disengage the rack portion 3a and the worm gear 2. With the switch dial in the B or F positions, the appropriate high portions of cam 14 will cause the raising of the plate 3 to engage the rack portion 3a with the worm gear 2.

A sector gear 16 suitably mounted on a shaft is provided adjacent the end 3e of the plate 3, an ear 16a being provided on the sector gear and engages the end 3e due to the bias of a spring 17.

An intermediate gear 18 meshing with the sector gear 16 is provided, a spring pawl 19 being secured to one face thereof and adpated to engage the teeth 20a of a ratchet gear 20 to advance the ratchet in a clockwise direction only. The ratchet gear 20 is further provided with peripheral teeth 20b which are engaged by a spring detent 21 to prevent counter clockwise rotation of the ratchet gear.

The relation between the amount of the movement of the horizontally moving plate 3 and the rotation angle of the intermediate gear 18, is predetermined so that the intermediate gear 18 can be rotated by 180° through the sector gear 16 when the horizontally moving plate 3 is moved by the rotation of the worm gear 2 from one 3d of the control projections to the other control projection 3c. A connecting pin 22 is provided on the ratchet 20 and secured at a distance $r$ from the axis of the rotary shaft thereof, and is connected to an interlocking plate 28 through a vertical slit 23a of a member 23 for changing the open angle of the shutter blades described hereinafter. The member 23 for changing the open angle of the shutter blades is movably supported by pins 24 and one end thereof is connected to a sleeve 29 for changing the open angle of the shutter blades. The member 23 will continuously change the open angle α of the shutter blades of the shutter shaft 1 at a constant rate in accordance with the movement of the member 23. The amount of the movement of the member 23 is determined by the degree of eccentricity of the connecting pin 22, and the maximum value thereof is 2r. The relation between the amount of the movement of member 23 and the open angle α of the shutter blade is so determined that when it is at the position as is shown in the drawing, the open angle of the blade becomes the maximum, and when it is moved to the right by 2r from the position of the drawing, the open angle of the blades becomes zero, i.e., the shutter blades are closed. An indicating dial 25 movable with the interlocking plate 28 is provided for reading and determining the open angle of shutter blades. On the dial a pattern representing the open angle by area and the notations α and c for showing the position of the maximum open angle and zero or closed position are provided, the dial indicia being read in connection with a fixed reference mark 26. A knob 27 is provided for convenience in setting the dial 25.

The following are the explanations about the functions of the above described members.

NORMAL PHOTOGRAPHY

First, the member 25 for determining the open angle of shutter blade is turned by the knob 27 to attain a desirable open angle of the shutter blade and then the notation N of the switching dial 11 is adjusted on the mark 12. The vertically moving plate 4 engages the small diameter portion 4′ of the switching cam 14 due to the spring 7 to disengage rack gear portion 3a of the horizontally moving plate 3 and the worm gear 2. The reversing lever engages the larger diameter portion 13″ of the reversal rotation cam 13 so that the shutter shaft 1 is rotated and the film advanced through the camera in the normal manner upon depression of the shutter button.

AUTOMATIC FADE-IN PHOTOGRAPHY

First, the maximum open angle notation α is adjusted on the mark 26 by turning the knob 27, and then the switching dial 11 is rotated in the direction as is shown by an arrow, and the notation F is adjusted on the mark 12. The switching cam 14 is displaced so that the larger diameter portion 14″ elevates the vertically moving plate 4 by a predetermined amount from the position as is shown in the drawing. The rack gear portion 3a of the horizontally moving plate 3 and the worm gear 2 are then meshed. The reversing lever is on the high portion of cam 13 and when the shutter button (not shown) is depressed, the shutter shaft 1 and the film feeding claw are operated in the normal or forward direction as in the case of the normal photography. Upon rotation of the shutter shaft, the horizontally moving plate 3 is moved to the right by the worm gear 2, and the tongue portion 3b thereof rotates the sector gear 16 in the counter clockwise direction against the force of the spring 17. The intermediate gear 18 is rotated in the clock-wise direction, and the ratchet gear 20 is rotated in the same direction through the spring pawl 19 and the teeth 20a.

Thus, the member 23 for changing the open angle of the shutter blades is moved to the right by the connecting pin 22, the sleeve 29 on the shutter shaft 1 slides on the shutter shaft 1 to reduce the open angle α of the shutter blades at a constant reducing rate.

When the control projection 3c of the horizontally moving plate 3 gets closer to the worm gear 2, the pin 2a on the worm gear 2 engages the projection 3c to stop the shutter shaft 1 at the very position, so that the phototaking is stopped.

When fade-in operation is desired the indicia C on the dial member 25 is aligned with the reference mark 26.

OVER-LAPPING PHOTOGRAPHY

When the automatic fade-out photography is completed, the switching dial 11 is further rotated in the direction as is shown by an arrow to align the notation B with the mark 12. The vertically moving plate 4 engages the larger diameter portion 14″ of the switching cam 14, and the reversal lever 8 falls into the small diameter portion 13′ of the reversal rotation cam 13. When the shutter button is depressed, the shutter shaft 1 is rotated in the opposite direction, and the film feeding claw is operated to rewind the film. The horizontally moving plate 3 is moved to the left by the worm gear 2, and the sector gear 16 is rotated in the clock-wise direction by the force of the spring 17. The intermediate gear 18 is rotated in the counter clockwise direction, the spring pawl 19 is operated in such a direction that it is disconnected from the first teeth 20a, so that the rotation of the gear 18 is not transmitted to the ratchet gear 20. The open angle of the shutter blade remains zero, i.e., the shutter blade is closed. Therefore, the film to be rewound is not exposed.

Thus, when the other control projection 3d of the horizontally moving plate 3 gets closer to the worm gear 2, the pin 2b is engaged by the projection 3d to stop the shutter shaft 1 at the position (as shown in the drawing), and therefore only the film having been subjected to fade-out photography, is rewound.

When the open angle of the shutter blade becomes zero, the notation F of the switching dial 11 is aligned with the mark 12 again, the reversal lever 8 is turned back to the original position (shown in the drawing), and when the shutter button (not shown) is depressed, the shutter shaft 1 and the film feeding claw are operated in the normal direction to carry out the overlapping photography. Since the horizontally moving plate 3 rotates the intermediate gear 18 in the clock-wise direction through the sector gear 16, the ratchet gear 20 is rotated in the same direction, and therefore the member 23 for changing the open angle of the shutter blades is moved to the left and the open angle α is continuously changed at a constant increasing rate. In other words, fade-in operation is carried out. Thus, as mentioned above, the control projections 3c of the horizontally moving plate 3 gets closer to the worm gear 2, and the shutter shaft 1 is stopped at the end of the movement, thus overlapping is carried out on the film having been faded out to carry out the fade-in photography. In this case, if necessary the notation α of the member 25 or the intermediate position is adjusted with the mark 26, and the same operation can be carried out.

It is therefore apparent that when this invention is employed, fade-in and fade-out operations are automatically operable when the shutter blade shaft is rotated upon depression of the shutter release button. The switching over between the two operations is automatically made upon selection of the desired operation. When fade-in or fade-out operations are made, it is therefore only necessary to release the shutter button which is an advantage over the prior art requiring the simultaneous operation of at least two buttons or levers.

What is claimed is:

1. A device for controlling the automatic dissolving shutter in a motor driven motion picture camera having a switching member for selectively controlling the rotation of the driving motor in a forward or a reverse direction, comprising, A multiple bladed rotatable shutter in which relative movement between the shutter blades varies the opening angle of the shutter aperture, a driving shaft adapted to rotate said shutter and to transport the film in a forward or reverse direction in accordance with the operation of the switching member, a driving train for relatively moving the shutter blades, including an eccentric member rotatable in one direction and connected to the shutter blades, a half revolution of said eccentric member closing the shutter aperture, a driving gear fixed on said driving shaft and rotatable therewith, a gear toothed member engageable with said driving gear and movable between first and second positions in cooperation with said driving gear, transmitting means for rotating said eccentric member by a half revolution in response to the movement of said gear toothed member from a first position to a second position, including a one way clutch for rotating said eccentric member when said driving shaft is rotating only in said forward direction, stopping means for preventing the rotation of said driving shaft in response to the movement of said gear toothed member including a pair of stops associated with said gear toothed member and respectively engaged with said driving gear to prevent the rotation thereof only when said gear toothed member is at its extreme positions, and control means for actuating the switch member to select the rotary direction of said driving shaft and selectively moving said gear toothed member to engage and disengage the gear toothed member and the driving gear.

2. A device according to claim 1, wherein said driving gear is provided with two projections to engage said respective stops on the gear toothed member.

3. A device according to claim 2, wherein the said pair of stops are provided on the respective ends of said gear toothed member, the first stop being engaged by one of said projections to prevent only forward rotation of said driving shaft when said gear toothed member is moved to its first position, and the second stop being engaged by the other of said projections to prevent only reverse rotation of said driving shaft when said gear toothed member is moved to its second position.

4. A device according to claim 3, wherein said gear toothed member is biased by spring means so that said gear toothed member is moved to its first position when it is disengaged from said driving gear.

5. A device according to claim 3, wherein said control means includes a supporting member slidably supporting said gear toothed member, and biased as to disengage said gear toothed member from said driving gear, and a pair of camming members rotatable in unison and having large diameter portions on the respective peripheral surfaces thereof, one of said camming members being engaged by said supporting member for engaging and disengaging the gear toothed member and said driving gear and the other of said camming members being engaged by the switching member to switch the rotary direction of said driving shaft when said gear toothed member is engaged with said driving gear.

6. A device according to claim 1, further comprising a shutter aperture adjusting means for varying the opening angle of the shutter blades, including an opening angle indicating member operable from outside the camera and a connecting member rotatable together with said indicating member connected to said eccentric member.

7. A device according to claim 1, wherein said one way clutch is a ratchet means including two ratchet toothed portions which are provided on the side face and the periphery of said eccentric member and two pawls engageable with said respective ratchet toothed portions.

References Cited

UNITED STATES PATENTS

| | | | |
|---|---|---|---|
| 1,404,404 | 1/1922 | Pittman | 352—217 |
| 3,043,185 | 7/1962 | Manderfeld | 352—217 |
| 3,246,944 | 4/1966 | Winkler | 352—91 |
| 3,425,776 | 2/1969 | Mayr | 352—91X |

JOHN M. HORAN, Primary Examiner

M. H. HAYES, Assinstant Examiner

U.S. Cl. X.R.

352—91